United States Patent [19]

Fjellman

[11] Patent Number: 4,589,836

[45] Date of Patent: May 20, 1986

[54] HYDRAULIC PRESS

[75] Inventor: Bo Fjellman, Mariestad, Sweden

[73] Assignee: Fjellman Press AB, Sweden

[21] Appl. No.: 741,012

[22] PCT Filed: Mar. 25, 1983

[86] PCT No.: PCT/SE83/00098

§ 371 Date: Nov. 9, 1983

§ 102(e) Date: Nov. 9, 1983

[87] PCT Pub. No.: WO83/03382

PCT Pub. Date: Oct. 13, 1983

Related U.S. Application Data

[63] Continuation of Ser. No. 563,393, Nov. 9, 1983, abandoned.

[30] Foreign Application Priority Data

Mar. 22, 1982 [SE] Sweden ................................ 8201802

[51] Int. Cl.[4] ................................ B29C 33/00

[52] U.S. Cl. ................................ 425/406; 72/701; 100/258 R; 425/411

[58] Field of Search ................ 425/149, 150, 406, 409, 425/411, DIG. 5, DIG. 129; 264/295, 319; 100/46, 214, 231, 295, 258 R, 258 B, 162 B; 72/455, 701

[56] References Cited

U.S. PATENT DOCUMENTS

| | | | |
|---|---|---|---|
| 3,136,181 | 6/1964 | Eckold | 72/701 |
| 3,195,183 | 7/1965 | Phillips | 425/466 |
| 3,426,116 | 2/1969 | Walters | 264/177 R |
| 3,446,879 | 5/1969 | Atkin | 264/40.5 |
| 3,570,060 | 3/1971 | Stephenson | 425/149 |

FOREIGN PATENT DOCUMENTS

| | | | |
|---|---|---|---|
| N68141b/58a | 10/1956 | Fed. Rep. of Germany | 100/46 |
| 1703297 | 4/1968 | Fed. Rep. of Germany | 100/46 |
| 745047 | 5/1933 | France | 100/214 |
| 159495 | 7/1957 | Sweden . | |
| 353911 | 10/1972 | U.S.S.R. | 100/214 |

*Primary Examiner*—Jay H. Woo
*Assistant Examiner*—J. Fortenberry
*Attorney, Agent, or Firm*—McGlew and Tuttle

[57] ABSTRACT

Hydraulic press including a frame with platens, at least one of which is carried or formed by a pressure plate structure adapted for transferring pressing force to an object between the platens, which press is adapted such that the pressure plate structure is substantially carried solely by horizontally adjustable supports mounted between the defining outer edges of such plate structure, such supports being positionally adjustable such that the surface of the corresponding platen assumes a predetermined shape during the pressing operation. The press suitably includes a mechanical mechanism for effecting the horizontal displacement in order to gain the desired positional adjustment of the supports.

18 Claims, 11 Drawing Figures

PRIOR ART
Fig. 1a
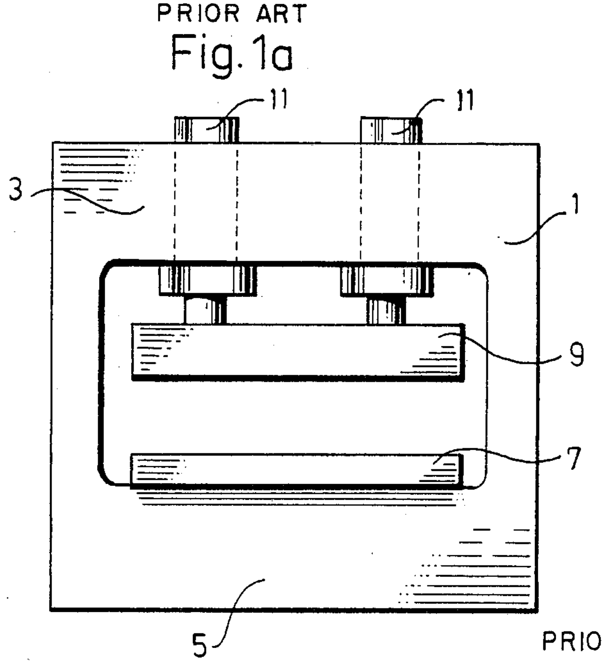
PRIOR ART
Fig. 1b
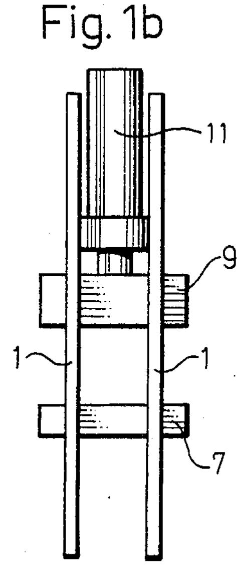
PRIOR ART
Fig. 2
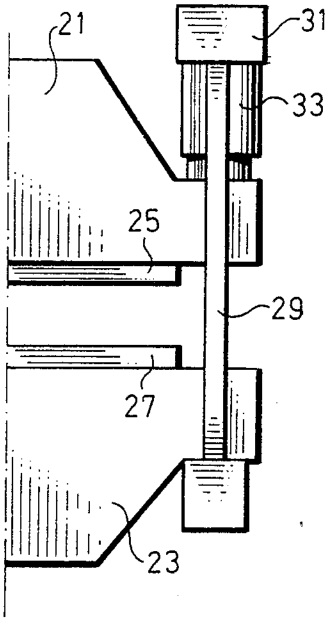
PRIOR ART
Fig. 3
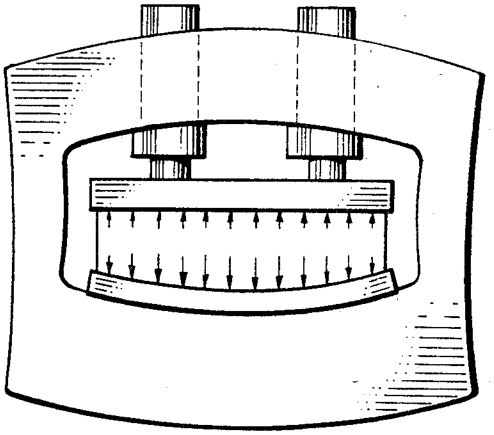
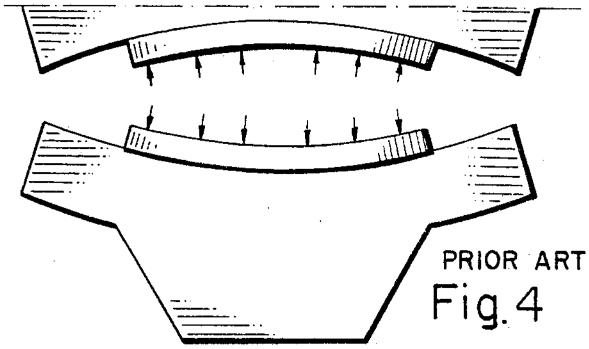
PRIOR ART
Fig. 4

HYDRAULIC PRESS

This application is a continuation, of application Ser. No. 563,393, filed Nov. 9, 1983 now abandoned.

FIELD AND BACKGROUND OF THE INVENTION

The present invention relates to a hydraulic press, and more particularly to a hydraulic press having adjustable supports for providing a platen surface thereof with a predetermined configuration during the pressing operation.

Known hydraulic presses may often be referred to as either of two basic types. In the one type they have a heavy frame, generally consisting of parallel frames made from steelplate with a fixed platen or table, and a movable platen or table actuated by force generating means. The other type includes two heavy plate or pressure beam structures, each of which can carry or form a platen or press table. The structures can be moved towards, or away from each other with the aid of force-generating means and yokes or C-shaped links. Although hereinafter briefly described, FIGS. 1*a*, 1*b* and FIG. 2 in the accompanying drawing are preliminarily referred to in this connection.

In FIG. 1 there are illustrated plate frames 1 with top portions 3 and bottom portions 5, while the numerals 7 and 9 respectively denote a fixed and movable platen, the latter being actuated by hydraulic cylinders 11. In FIG. 2 the numerals 21 and 23 respectively denote top and bottom pressure plate structures with respective top and bottom platens 25 and 27, while 29, 31 denote a yoke keeping the pressure plates 23 and 21 together. The plates 21 and 23 can be urged towards each other with the aid of the yoke and hydraulic cylinders 33.

When forces are applied with the aid of the corresponding hydraulic cylinders the FIG. 1*a* frames 1 and the FIG. 2 members 21, 23 deflect in a manner exaggeratedly illustrated in FIGS. 3 and 4, respectively. In many cases this results in considerable drawbacks, e.g. in pressing records which must have a very uniform thickness, moulding goods in moulds which must be kept parallel, deep-drawing sheet in presstools, shearing, edge folding of plates, tubes etc.

Different measures have been proposed for reducing the deflection exemplified in FIGS. 3 and 4. The frames, pressure beam structures etc. can be made very stiff by increasing their material content, but this is an expensive solution that also increases the weight of the press. The surfaces can also be given an initial curvature by uneven heating of the frames, such as to keep deflection within acceptable limits when the force is applied. This is however a solution that is relatively expensive, especially from an operational standpoint and is furthermore only usable in a restricted number of applications. It has also been suggested to float the platen on a hydrostatic bed, which likewise is an expensive solution in this case also requiring extra safety measures.

SUMMARY OF THE INVENTION

The present invention provides a generally utilizable principle for satisfying prevailing desires regarding the shape of the platen pressing surface during pressing in a high pressure press. A hydraulic press in accordance with the invention includes a frame with platens, at least one of the latter being carried or formed by a pressure plate structure adapted for enabling transmission of the pressing force to the object to be pressed between the platens. The inventive press is distinguished in that the pressure plate structure carrying or forming the platen is essentially carried solely by supports, positioned between the defining edges of the structure, these supports being positonally adjustable, such that the surface of the platen assumes a predetermined shape during the pressing operation.

In most cases, the desired pressing surface is as flat as possible, or follows the shape of the other platen, which ensures uniform thickness of the item produced as far as possible.

It should be emphasized that the pressure plate structure is to be free in respect of movements in the pressing direction in relation to the press frame, i.e. not clamped or supported by it other than with the adjustable supports mentioned above. It is further emphasized that carrying the pressure plate structure on the press frame with the aid of said supports should not have the character of a rigid attachment of the structure relative to the frame, but instead should have the character of free support relative to the frame.

BRIEF DESCRIPTION OF THE DRAWINGS

The invention will now be described in detail in the following, in conjunction with the accompanying drawings, wherein FIGS. 1*a* and 1*b* illustrate the constructional principle of a press of one type, and FIG. 2 the constructional principle for another type, FIGS. 3 and 4 illustrate the respective deflections during pressing for the two types.

DESCRIPTION OF THE PREFERRED EMBODIMENTS

Figure 5:
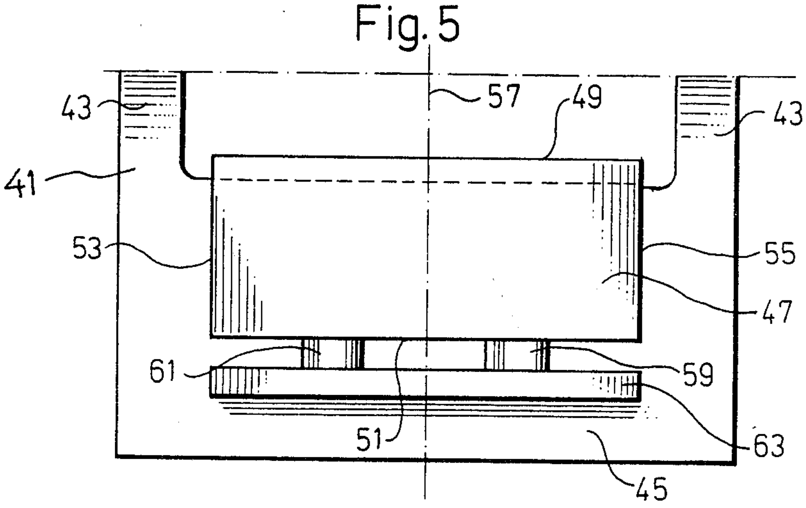
FIG. 5 is a schematic and partial illustration of a first embodiment of a hydraulic press in accordance with the invention, illustrating the principle of movable supports for the pressure plate structure.

The embodiment in accordance with the invention, illustrated schematically in FIG. 5 from one long side, of a high-pressure press, includes a frame 41 with vertical plates 43 on either side of a plane of symmetry 57 pertaining to the frame, bottom horizontal plates 45 uniting the vertical plates on either side of the plane 57, and top (unillustrated) horizontal plates, similarly arranged. FIG. 5 only shows the bottom portion of the press with the stationary platen. The top part with the movable platen and hydraulic cylinders is not shown, but may be of the type illustrated in FIG. 1.

A plate structure is denoted by 47, e.g. mutually parallel plates in the plane of the paper in FIG. 5, with an upper, substantially flat surface 49 forming or carrying the fixed platen of the press, and a lower, substantially flat surface 51, against which the support means or individual supports 59, 61 engage, the latter being carried by a plate 63 mounted on the lower horizontal plates 45 of the frame. The pressure plate structure 47 has vertical end surfaces or outwardly defining edges 53 and 55, which are free in relation to the surrounding frame the supports 59, 61 are mounted between such outwardly defining edges 53 and 55. The supports 59, 61 are suitably made from bars with a suitable homogenous cross section.

Figure 6:
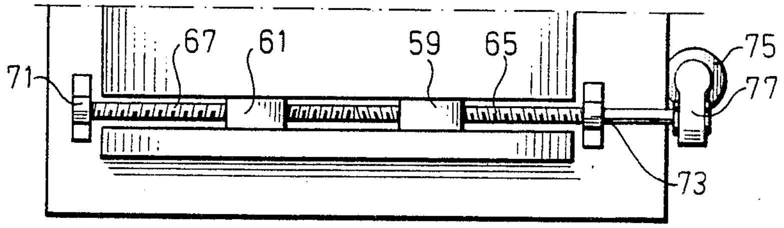
FIG. 6 shows an embodiment with a motor-driven apparatus for moving the supports, FIGS. 7*a* and 7*b* schematically illustrate the principle for a third and fourth embodiment.
Figures 7A, 7B:
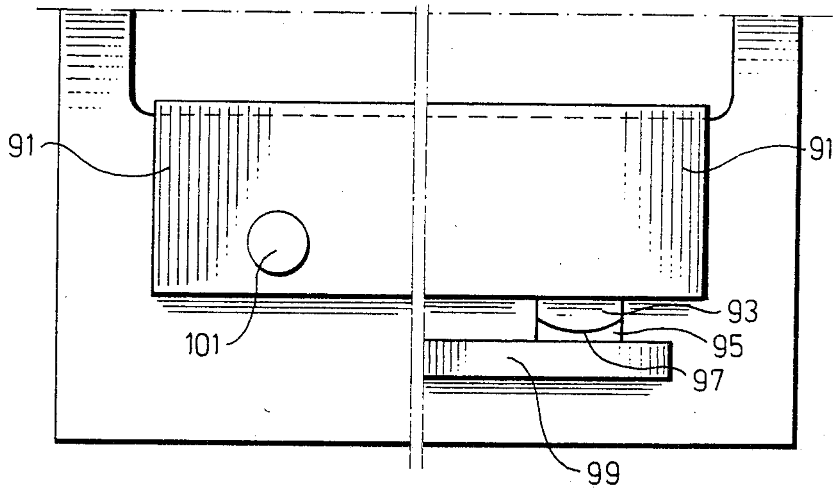

In accordance with the invention, the supports 59, 61 are movable to a desired distance from the central plane 57 of the press, i.e. within the peripheral confines of the outwardly defining edges of the structure 47. It will thus be possible to control deflection of the structure 47 when it comes under load. For example, the deflection can be calculated beforehand with the aid of a computer, and thereby the appearance of the platen upper surface 49, can be predetermined this being decisive for variations in the thickness of the pressed item in the production of lamellar pressed goods, and the tolerances thereof in the stamping direction during production of shaped goods. Ready computer programs for this typical case are available. The folding angle for edge folding may be calculated in a similar manner. The manual or other aids which may be utilized for moving the supports 59, 61 may be of different kinds known in the art, and therefore only a version using the screw principle is illustrated in FIG. 6 by way of example.

Figure 8:
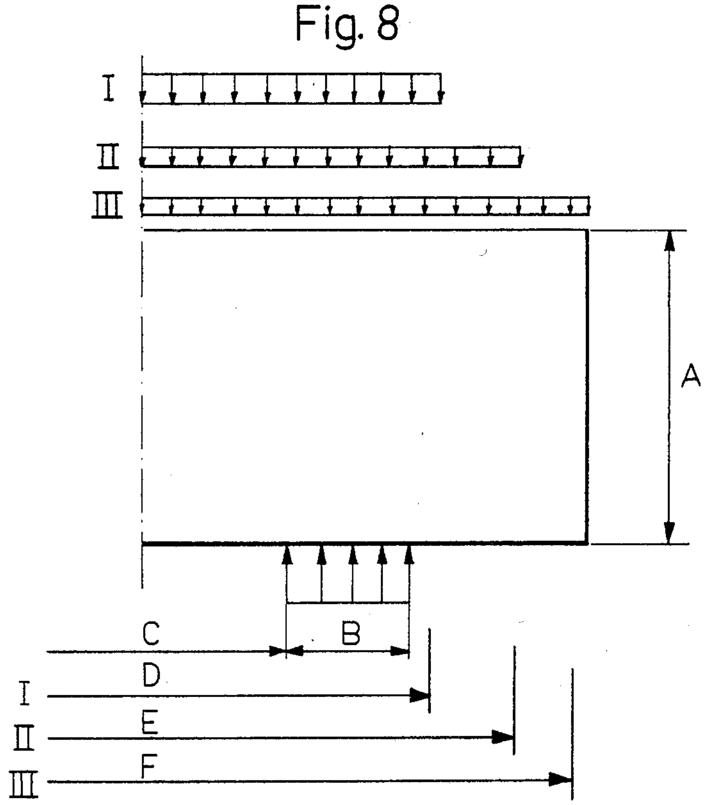
FIGS. 8 and 9 illustrate comparative values regarding calculations for the deflection in a pressure beam structure for three loading cases.

The conditions for calculating the deflection of the pressure plate structure 47 for three loading cases, selected as examples, are illustrated in FIG. 8, the support 59 (as well as the support 61) having the configuration and placing or relative positioning depicted in the Figure, i.e. in FIG. 8. The height of the pressure plate structure is 1000 mm. The total load is 18 MN in all three cases, although load distribution on the pressure platen 49 is different. The calculated deflection of the pressure plate structure upper surface 49 in each of the three cases is seen on a larger scale in FIG. 9. Case II gives less maximum deviation X from the flat surface of the pressed item than Case I, and in Case III the deviation is in the opposite direction in relation to cases I and II.

Figure 9:
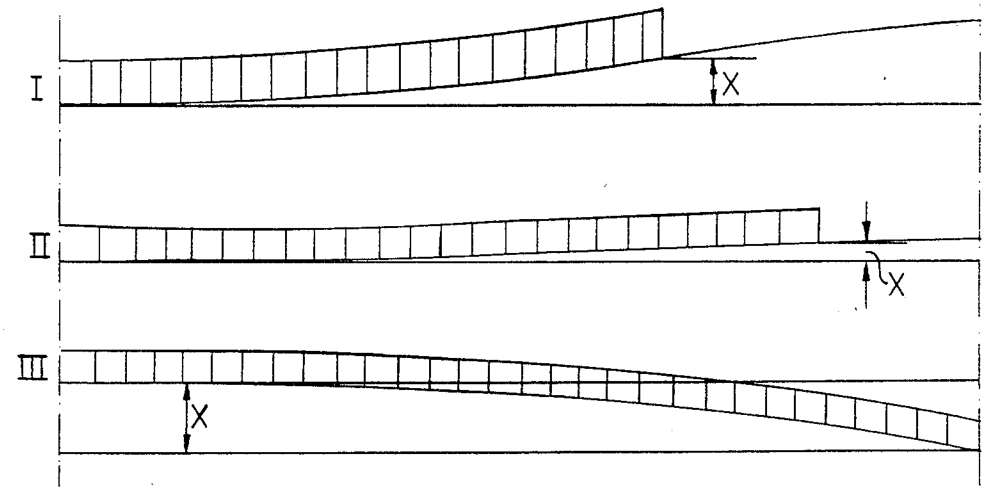

The following data are applicable for the cases in FIGS. 8 and 9:

A=1000 mm
B=400 mm
C=980 mm
D=1930 mm
E=2490 mm
F=3050 mm
t=2×80 mm
Modulus of elasticity=210 00 N/mm$^2$
v=0.3

The computer used was a LUCAS (R01041) 800425 (730 FL).

The calculations gave the following results:

Case I: X=0.3542 mm
Case II: X=0.0907 mm
Case III: X=0.4485 mm

Regarding the calculation of the deflection in accordance with the foregoing, it will be seen that in the three cases I, II and III the total load is the same and equal to 18 MN, but the load distribution on the pressure platen 49 is different.

In case I the load is distributed over a length D=1930 mm, in case II the same load is distributed over a length E=2490 mm, and in case III the same load is distributed over a length F=3050 mm, said loading distribution being symmetric vis-a-vis the plane of symmetry 57.

In FIG. 8 the support 59 is represented by an upward pressure, distributed over a length B=400 mm at a location on the lower side of the pressure plate structure as shown in FIG. 8. FIG. 8, of course, just shows the right half of the pressure plate structure; however, the support 61 is correspondingly placed under the left half of the pressure plate structure and the load distribution is the same in this latter half of the structure.

The positions of the support 59,61 represented by the upward pressure over the length B are of course the same in the three cases.

For the three cases described above, the deflection of the pressure plate structure upper surface 49 is calculated by the finite element method, i.e. in the calculations the pressure plate structure is divided into a number of elements or zones. The results of these calculations are shown in FIG. 9, which thus shows the calculated deflection of the pressure plate structure upper surface from a plane surface with the deflections shown enlarged to make the Figure clearer.

In FIG. 9, of course, only the deflection in the right half of the pressure plate structure is shown, the deflection in the left half thereof being equal thereto. The three described cases with three different load distributions and fixed positions of the supports are equal with respect to the deflection of the pressure plate structure upper surface 49 to three different positions of the supports and a constant load distribution, Thus, FIG. 9 illustrates the effect of moving the supports 59,61.

FIG. 6 illustrates how the supports 59, 61 in FIG. 5 may be displaced with the aid of a motor 75 and an associated gear 77. The latter is connected to a straight bar mounted in two bearings 71 and 73, and having two opposingly threaded sections 65 and 67, each positionally controlling a support 59, 61. It will be seen from the Figure that when the bar is rotated the supports will move just as much, but in opposite directions relative to the plane of symmetry 57, accordingly assuring symmetrical deflection of the structure 47. The motor 75 or gear 77 is provided with control means for rotation reversal of the bar, and possibly its rate of revolutions.

The bar may also be adapted for manual rotation, with or without a reduction gear.

It is obvious that by applying the invention in each individual case, it is easy to determine beforehand the positions of the supports 59, 61 giving the least possible deviation of the platen from the ideal surface. This surface may be completely flat, although such a condition is not always necessary. FIGS. *7a* and *7b* schematically illustrate two alternatives for supporting a pressure plate structure in accordance with the invention. In FIG. *7a* the structure 91 may be carried by supports comprising two parts 93 and 95, mutually engaging at a cylindrical or spherical interface 97, this arrangement providing for small angular variations between the structure 91 and the support portion 99. Alternatively, as may be seen from FIG. *7b*, the structure 91 may be carried by through bolts 101.

The press types illustrated in FIGS. 1, 3, 5 and *7a*, *7b* are similar. However, the invention may also be applied to the type illustrated in FIGS. 2 and 4, by the introduction of a special pressure plate structure, forming or carrying the platen 27, and which is carried by the bottom portion 23 of FIG. 2 with the aid of movable supports, according to the same principle depicted in FIGS. 5 and 6.

It should be noted that the number of movable supports for the pressure plate structure may be more than two, for further reducing the maximum deflection of the structure during pressing operations.

It is also emphasized that the term "pressure plate structure" in its present context is not limited to relate to any special geometrical shape, since the dimensions of the structure and its interrelating sizes may be varied greatly from case to case. The term thus includes such structures used in edge folding and the like.

The invention is this not restricted to the illustrated and described embodiments, since thses may be varied and modified in many ways within the scope of the invention.

I claim:

1. Hydraulic press comprising a frame having opposed platens provided with platen surfaces positioned for relative movement toward and away from each other, in which at least one of the platens is located on a pressure plate structure comprising mutually parallel plates having outwardly defining edges, said pressure plate structure constituting means for transferring the pressing force of the press to the article being pressed between the platens, and in which said pressure plate structure is carried solely by a plurality of horizontally adjustable individual support means mounted between the outwardly defining edges of said pressure plate structure and in which said support means are horizontally displaceable to a predetermined position such that the corresponding platen surface assumes a predetermined configuration during the pressing operation.

2. Hydraulic press of claim 1, wherein two individual said support means are provided for the corresponding said pressure plate structure.

3. Hydraulic press of claim 1, wherein the support means comprise bars.

4. Hydraulic press of claim 1, wherein the support means comprise beams.

5. Hydraulic press of claim 1, wherein said pressure plate structure comprises a plurality of special steel plates.

6. Hydraulic press of claim 1, wherein two individual said support means are provided for the corresponding said pressure plate structure, and the mechanical means include a straight rotatable bar, having two opposingly threaded protions adapted for co-action with, and displacement of, an associated one of said support means for effecting symmetrical movement of the support means toward and away from each other along the rotatable bar.

7. Hydraulic press of claim 1, wherein said at least one of the platens is carried by the corresponding said pressure plate structure.

8. Hydraulic press of claim 1, wherein said at least one of the platens is formed by the corresponding said pressure plate structure.

9. Hydraulic press of claim 1, wherein the support means are carried on an outer support portion of the frame remote from the corresponding said pressure plate structure, and each support means comprises a pair of co-acting parts mutually engaging at an interface therebetween and arranged for providing small angular variations between the outer support portion of the frame and said pressure plate structure.

10. Hydraulic press comprising a frame having opposed platens provided with platen surfaces positioned for relative movement toward and away from each other, in which at least one of the platens is located on a pressure plate structure comprising mutually parallel plates having outwardly defining edges, said pressure plate structure constituting means for transferring the pressing force of the press to the article being pressed between the platens, and in which said pressure plate structure is carried solely by a plurality of horizontally adjustable individual support means mounted between the outwardly defining edges of said pressure plate structure and which said support means are provided with mechanical means for effecting the horizontal displacement of the support means to a predetermined position such that the corresponding platen surface assumes a predetermined configuration during the pressing operation.

11. Hydraulic press according to claim 10, wherein two individual support means are provided for the corresponding pressure plate structure.

12. Hydraulic press according to claim 10, wherein said support means comprise bars.

13. Hydraulic press according to claim 10, wherein said support means comprise beams.

14. Hydraulic press according to claim 10, wherein said pressure plate structure comprises a plurality of spaced steel plates.

15. Hydraulic press according to claim 10, wherein two individual said support means are provided for the corresponding said pressure plate structure, and the mechanical means include a straight rotatable bar, having two opposingly threaded portions adapted for co-action with, and displacement of, an associated one of said support means for effecting symmetrical movement of the support means toward and away from each other along the rotatable bar.

16. Hydraulic press according to claim 10, wherein said at least one of the platens is carried by the corresponding said pressure plate structure.

17. Hydraulic press according to claim 10, wherein said at least one of the platens is formed by the corresponding said pressure plate structure.

18. Hydraulic press according to claim 10, wherein the support means are carried on an outer support portion of the frame remote from the corresponding said pressure plate structure, and each support means comprises a pair of coating parts mutually engaging at an interface therebetween and arranged for providing small angular variations between the outer support portion of the frame and said pressure plate structure.

* * * * *